Patented Mar. 31, 1942

2,278,168

UNITED STATES PATENT OFFICE 2,278,168

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application January 25, 1941, Serial No. 375,978

8 Claims. (Cl. 252—335)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The chemical compound or composition of matter herein described that is employed as the demulsifier of our process, is a new material, representing a sub-genus of a broad class of sulfation derivatives which may be in the form of an ester, a salt, or an acid, but preferably, in one of the two last mentioned forms. If a high molal sulfonic acid be indicated by the conventional formula:

then a hydroxylated ester which may actually have more than one hydroxyl group in the radical which replaces the sulfonic acid hydrogen atom, may be indicated by the following formula:

If such ester, for instance, the ester derived from ethylene glycol, is treated with sulfuric acid, one then can obtain a sulfate of the sulfonic acid ester, as indicated in the following manner:

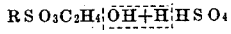

The neutralization product derived therefrom by the use of ammonium hydroxide, for example, may be indicated by the following formula:

A material of the kind above described illustrates the compounds herein contemplated with certain added provisos:

(a) That the sulfonic acid in the form of a salt or acid be surface-active, as subsequently defined;

(b) That the ester derived therefrom prior to sulfation, be water-insoluble; and (c) That the sulfonic acid be derived from higher fatty acids.

The compounds herein contemplated are derivatives of surface-active sulfonic acids.

By "surface-active" it is intended to mean that a relatively dilute solution of alkali metal salts, for instance, the sodium or potassium salt and also the ammonium salt, in a solution containing a few tenths of a percent or thereabouts, will show a marked lowering of the static surface tension in comparison with distilled water. Usually, the acids themselves show the same surface-active property as the salts.

Although the types of compounds employed as the demulsifier in the present process are new chemical products, certain of the raw materials used in the manufacture of said chemical products, to wit, higher fatty sulfonic acids are well known compositions of matter. However, as they may be derived in a variety of ways and may show a difference in degree, reference is herein made to suitable means for obtaining higher fatty sulfonic acids, particularly adapted as raw materials in the manufacture of compounds of the kind herein contemplated.

It is obvious that the procedure herein described is applicable to the manufacture of various surface-active sulfonic acids, such as fatty sulfonic acids, fatty aromatic sulfonic acids, alkylaryl sulfonic acids, and the like. Such broad aspect is contemplated in our co-pending application Serial No. 375,974, filed January 25, 1941, in which there is detailed description of a large variety of acceptable types of sulfonic acids which may be employed as reactants to produce compounds analogous to the particular specie or sub-genus herein contemplated.

The present invention relates to a sub-genus of the broad class just described. It is concerned only with sulfonic acids derived from higher fatty acids. The higher fatty acids represent monocarboxy acids having not less than eight and not more than 32 carbon atoms. They may be saturated, unsaturated, hydroxylated, non-hydroxylated, etc. They occur commonly as esters, i. e., glycerides in naturally occurring oils and fats. They are derived from animal or vegetable sources. Common examples include oleic acid, stearic acid, ricinoleic acid, linoleic acid, linolenic acid, etc. Fatty sulfonic acids in the present instance are concerned with those types in which the sulfonic acid radical is introduced in the position other than the carboxylic hydrogen atom position, and is not intended to include the type sometimes referred to as a sulfo-aromatic fatty acid, i. e., the type in which the sulfonic group is introduced only in an aromatic nucleus. The manufacture of such fatty sulfonic acids is well known. Such compound may be produced in a variety of ways. Sometimes the procedure results in the formation of the salt instead of the sulfonic acid itself. In such instances the salt, for instance, the sodium salt, can readily be converted into the corresponding acid by various procedures. The salt may be dissolved in an alcohol and treated with hydrochloric acid gas so as to liberate the free sulfonic acid along with the precipitation of sodium chloride. The alcoholic solution of the sulfonic acid can be separated from the inorganic salt and the alcohol subsequently evaporated. As illustrating various conventional procedures for the manufacture of fatty sulfonic acids of the kind herein contemplated, attention is directed to the following United States patents, to wit:

No. 1,835,404, dated December 8, 1931, Kalischer et al.; 1,910,459, dated May 23, 1933, Bertsch; 1,926,442, dated Sept. 12, 1933, Gunther et al.; 1,931,491, dated Oct. 24, 1933, Haussmann. Also note British Patent No. 321,689 (1929) to Auer; and British Patent No. 342,761 (1931) to I. G. Farbenindustrie Aktiengesellschaft.

Sulfo fatty acids can be converted into hydroxylated esters in various ways. Subsequently, it will be pointed out that the preferred procedure involves the use of an alkylene oxide, such as ethylene oxide, butylene oxide, propylene oxide, or the like. In the use of such last mentioned reactant it becomes obvious that reaction may take place with the carboxylic hydrogen atom, if present, as well as with the sulfonic acid hydrogen atom. The compounds contemplated in the present instance are concerned with those which are obtained from intermediates which represent hydroxylated esters of the sulfonic acid radical. For this reason the introduction of an hydroxylated residue in the carboxylic hydrogen position with subsequent sulfation does not yield compounds of the kind herein contemplated. If this type of sulfation takes place along with the sulfation of an hydroxylated residue, present in the sulfonic hydrogen atom position, then there is no objection and such sulfation is entirely immaterial. Thus, contemplating the sulfo fatty acids from the standpoint of the carboxylic hydrogen atom, it is immaterial whether this atom remains as such or is converted into or is replaced by a hydroxylated hydrocarbon residue or changed into some other form such as an amido or salt form. As will be subsequently pointed out, we prefer to replace the carboxylic hydrogen atom by an alkyl, aralkyl, or alicyclic radical.

If the sulfonic acid is converted into the sodium salt without neutralization of the carboxylic hydrogen atom, and if such monobasic salt is reacted with glycol chlorhydrin so as to eliminate sodium chloride, one has available an hydroxylated ester of the kind desired, in which the carboxylated hydrogen remains as such. Such material may be sulfated without change in regard to the carboxyl group. The final product may be neutralized so that the carboxylic hydrogen atom may be replaced by any of the various metals or groups which are suitable for replacing the sulphato hydrogen atom. It is also to be noted that if the fatty acid present contains a hydroxy group, as in the case of ricinoleic acid, hydroxy stearic acid, or the like, or if it contains an ethylene linkage such as oleic acid, then sulfation at such reactive positions may take place along with sulfation of the hydroxylated hydrocarbon radical which has replaced the sulfonic hydrogen atom. Needless to say, such acidic hydrogen atom can be replaced by any suitable metal or the like in the same manner as indicated in connection with the sulfate radical introduced as part of the residue which replaces the sulfonic acid hydrogen atom.

The procedure of manufacturing hydroxylated esters of sulfonic acids is well known, although direct reaction between a sulfonic acid and a polyhydric alcohol such as ethylene glycol is not applicable, for the reason that one obtains little or no yield of the hydroxylated ester. One procedure contemplates the conversion of sulfonic acids into the sulfonchloride, and subsequently, reacting the sulfonchloride with the polyhydric alcohol with the liberation of hydrochloric acid. Another procedure involves reaction between the sulfonic acid, or preferably, a salt, such as the sodium salt, and a chlorohydrin.

The preferred way of preparing such materials is to use the procedure described in U. S. Patent No. 2,208,581, dated July 23, 1940, to Hoeffelmann. Briefly stated, the procedure employed is to obtain a free sulfonic acid in an anhydrous state and treat with a compound containing an ethylene oxide radical. As typical examples of applicable compounds may be mentioned glycerine epichlorhydrin, glycide alcohol, ethylene oxide, propylene oxide, butene-2-oxide, butene-1-oxide, isobutylene oxide, butadiene oxide, butadiene dioxide, chloroprene oxide, isoprene oxide, decene oxide, styrene oxide, cyclohexylene oxide, cyclopentene oxide, etc.

Note, however, that there are certain differences between the procedure employed for the manufacture of the intermediate raw material and the procedure as employed in said aforementioned Hoeffelmann patent. The Hoeffelmann method contemplates treatment of sulfonic acids which are not necessarily surface-active, for instance, benzene-sulfonic acid, with an olefine oxide, so as to produce materials which, for the main part, are water-soluble and surface-active. It happens that invariably the esters of the high molal sulfonic acids are insoluble in absence of a recurring ether linkage. In order to obtain compounds of the kind herein contemplated, one must stop treatment with the olefine oxide, i. e., oxyalkylation, before water solubility is obtained; and furthermore, it is desirable to stop water solubility at the earliest stage. In other words, the olefine oxide employed, whether ethylene oxide, propylene oxide, butylene oxide, glycidol, methyl glycidol, or the like, is a comparatively expensive reagent; and one is only concerned with obtaining a reactive hydroxyl radical for a subsequent sulfation step. There is no objection to the presence of a recurring ether linkage, provided that the ester is still water-insoluble. This may be illustrated in the following manner, using ethylene oxide as the reactant.

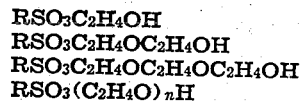

One is interested primarily in obtaining a material of the following type:

But materials illustrated by any of the three subsequent types:

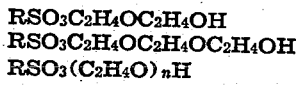

are just as satisfactory, provided that the ester, prior to sulfation, is water-insoluble. In some instances the presence of the recurring ether linkage may give some added desirable characteristic. Ordinarily speaking, one is concerned only with minimum reactant cost; and thus, the use of an excess amount of the olefine oxide is not justified. One is not attempting to obtain water solubility by means of the expensive oxyalkylation step. As has been emphasized, the ester obtained must be water-insoluble, regardless of how much or how little alkylene oxide is employed. Generally speaking, 40 moles of alkylene oxide per mole of sulfonic acid may be considered as an upper limit, but obviously, solubility is influenced by the alkylene oxide employed. Butylene oxide naturally will not cause a sulfonic acid to be converted into a water-soluble ester as readily as ethylene oxide.

Thus, having obtained hydroxylated water-insoluble esters—and they may be polyhydroxylated and may or may not contain the recurring ether linkage—the next step is to submit them to a conventional sulfation process. The sulfation of such materials is the conventional procedure employed for the sulfation of fatty acids or fats containing the hydroxyl radical or ethylene linkage, such as oleic acid, olein, ricinoleic acid, triricinolein, monostearin, and the like. A similar procedure is employed in the sulfation of amides derived from fatty acids and hydroxylated amines, such as the stearic acid amide of monoethanolamine. A similar procedure is employed in connection with the sulfation of high molal alcohols and other similar materials.

Briefly stated, the procedure consists in treating the material with the amount of sulfating agent at least molecularly equal to the material to be sulfated; and usually, the sulfating agent is employed in considerable excess, for instance, from 50% excess to 200% excess, based on molal proportions. Sulfating agents include sulfuric acid of commerce, monohydrate, oleum of various strengths, chlorosulfonic acid, sulfamic acid, etc. Sulfonation is generally conducted at a relatively low temperature, from approximately zero degrees centigrade to a temperature of 35–40° C. or therabouts. Sulfation can be conducted in the presence of a solvent, such as liquid sulfur dioxide, chlorinated hydrocarbons, dioxane, ethyl ether, propyl ether, etc. Sometimes it is desirable to add materials which tend to take up any water which may be formed, such as organic anhydrides, including acetic anhydride. When sulfation is complete, which is usually indicated by absolutely clear solubility of the sulfated product, it is generally washed immediately so as to remove the excess sulfating agent. Washing is generally conducted with cold water, chilled brine, or ice. The sulfated material is permitted to separate and the dilute draw-off acid withdrawn. The sulfated mass may be employed as such, or may be neutralized in any convenient manner with any one of the conventional basic materials frequently employed, such as caustic soda, caustic potash, ammonia, various hydroxylated amines, including monoethanolamine, diethanolamine, triethanolamine; and non-hydroxylated amines, including amylamine, benzylamine, cyclohexylamine, and the like. Such materials may be neutralized with polyvalent compounds, such as calcium oxide, magnesium oxide, polyamines, including ethylene diamine, diethylene triamine, triethylene tetramine, etc.

Example 1

The sulfonic acid derivative of stearic acid is produced according to Example 1 of aforementioned Gunther and Hetzer Patent No. 1,926,442. The sulfo stearic acid so obtained is converted into the anhydrous state by any suitable procedure. It may be heated to approximately 110 to 120° C., and dried carbon dioxide gas passed through until the material is anhydrous. It may be dried in a vacuum drier so as to yield an anhydrous material. It may be distilled in presence of an insoluble solid, such as xylene, so that the xylene is permitted to carry off water during the distillation. Vapors, so obtained, are condensed and the water separated from the xylene. The xylene can be returned for re-circulation, so as to carry off more water.

Having obtained a non-hydrous material of the kind above described, it is diluted with several times its weight of anhydrous ethyl alcohol and refluxed until the carboxyl hydrogen atom has been replaced by an ethyl radical. One pound mole of the anhydrous ethyl stearate sulfonic acid, so obtained, is treated with one to three moles of ethylene oxide in the manner described in the aforementioned Hoeffelmann Patent No. 2,208,581, so as to yield a water-insoluble ester. Such ester is sulfated in the conventional manner employed for such type material with approximately 65% to 100% by weight of monohydrate. The sulfation is most conveniently conducted in apparatus designed to mix even solid materials with the sulfating agent. A sulfation temperature of approximately 35–45° C. is employed. The acid is added as rapidly as possible, and as a rule sulfation can be completed within 2–4 hours. When sulfation is complete, the acid mass should give an absolutely clear, limpid, solution in water. Failure to obtain such clearly soluble sulfated mass is due to either over-sulfation or under-sulfation. Over-sulfation means that the period of sulfation is too long and decomposition of the sulfated material took place progressively with sulfation. In such case, it is probable that the period of sulfation should be decreased somewhat. Under-sulfation can be corrected by increasing the volume of sulfating agent or increasing its activity, for instance, using a mixture of oleum and monohydrate, or else perhaps, extending the period of sulfation slightly. As is understood by those skilled in the art, such sulfation procedure depends on the particular sulfating agent employed, and there is no difficulty in varying these factors so as to obtain absolutely water-soluble properties. When sulfation is complete, the mass is washed with cold water, or preferably, with a mixture of chipped ice and water. The amount of water added is preferably equal to the amount of sulfating agent added. The mixture is stirred and allowed to stand the minimum length of time necessary to give a complete separation. Sometimes separation is hastened by the use of a chilled brine instead of water, or by the addition of a solvent, particularly if such solvent is not objectionable in the final product. Such solvent may be a material of the kind exemplified by xylene, kerosene, propyl ether, and the like. After separation is complete, the waste acid is withdrawn and the acid mass neutralized in any convenient manner. Generally speaking, it is our preference to neutralize with ammonia to slightly past the methyl orange endpoint, i. e., until the material shows just the slightest basicity. The product so obtained may be employed for various purposes, and particularly for demulsification.

Example 2

The palmitic acid derivative, as described in Example 2 in the aforementioned U. S. Patent No. 1,926,442 is used in place of the stearic acid derivative employed in Example 1 in the present instance.

*Example 3*

The oleic acid derivative described in Example 4 of the aforementioned Patent No. 1,926,442 is employed instead of the corresponding stearic acid derivative described in Example 1 in the present instance.

*Example 4*

A sulfo-oleic acid is manufactured in the manner described in Example 4 of aforementioned U. S. Patent No. 1,931,491 and substituted in place of the corresponding stearic acid derivative in Example 1 of the present instance.

*Example 5*

Alpha-sulfo lauric acid is obtained in the manner described in the aforementioned U. S. Patent No. 1,910,459 and employed instead of the corresponding stearic acid derivative in Example 1 of the present instance.

*Example 6*

The sodium salt obtained in the manner described in Example 1 of aforementioned British Patent No. 342,761 is converted into the free acid by solution in alcohol and treatment with hydrochloric acid gas in the manner previously described. The acidic product, so obtained, is employed in place of the corresponding stearic acid derivative in Example 1 of the present instance.

*Example 7*

The same procedure is followed as in Examples 1–6, inclusive, preceding, except that four to six moles of ethylene oxide are used instead of one to three.

*Example 8*

Propylene or butylene oxide is substituted for ethylene oxide in Examples 1–7, inclusive, preceding.

*Example 9*

The same procedure is followed as in Examples 1–8, inclusive, except that an amine of the kind exemplified by monoamylamine, cyclohexylamine, or benzylamine is used as a neutralizing agent.

It is to be noted that the last example illustrates a type in which the compounds obtained are water-insoluble. Such water-insoluble types are particularly adaptable for many purposes, and in fact, in many instances are just as desirable, or even more desirable for demulsification of certain crude oils than are the corresponding water-soluble types. In the sulfation step it has been previously pointed out that a solvent may be employed, particularly if the material employed is substantially solid at the sulfation temperature. A class of very suitable solvents includes the chlorinated alkanes, such as chloroform, carbon tetrachloride, trichlorethylene, dichlorpentane, etc. Incidentally, in some instances, particularly where glycidol is used for oxy-alkylation, one may obtain an ester in which more than one acid sulfate radical is introduced.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

In the hereto appended claims, the word "acyl" is used in reference to the radical $RSO_2$; i. e., one can conveniently consider the sulfonic acid $RSO_3H$ in terms of a formula indicating part of its structure, to wit, $R.SO_2.OH$.

In the hereto appended claims the words "polyhydric alcohol" are used in the conventional sense to include not only materials of the type exemplified by glycerol and ethylene glycol, but also materials of the kind in which the carbon atom chain is interrupted at least once by an oxygen atom, as, for example, diethylene glycol, diglycerol, etc.

It may be well to emphasize that the compounds of the kind herein contemplated may be manufactured by any suitable method; and it is not intended to limit the compounds to any particular method of manufacture. When manufactured by the use of an alkylene oxide, it is our preference to use ethylene oxide, propylene oxide, or butylene oxide.

It is to be noted that the sulfato sulfonates and the sulfato sulfonic acids referred to in the claims are surface-active in the same sense that sulfonic acids themselves are surface-active. Furthermore, it is to be noted that some sulfonic acids might be of the polysulfonic acid type, i. e., as exemplified by disulfonic acids. There is no objection to the use of such raw materials as reactants, and it is obvious that such procedure presents a means by which one obtains an ester in which either one or both terminal hydroxyl radicals may be sulfated.

The oxidation of certain fractions derived from paraffin base crudes yields monocarboxy aliphatic acids which are isomers of the naturally-occurring fatty acids of the saturated type, i. e., corresponding to lauric acid or the like, with the difference that instead of having straight carbon atom chains, such acids are likely to have various types of branched chains, and in some instances, the carboxyl radical is not attached to an end carbon atom, but may be attached to an intermediate carbon atom. Obviously, such compounds can be converted into sulfonic acids in the same manner employed for the conversion of lauric acid, palmitic acid, stearic acid or the like, and such sulfo derivatives may be considered as the obvious functional equivalent of materials of the type herein contemplated, and it is intended that they should be so considered in the hereto appended claims.

Once more attention is directed to the fact that in the hereto appended claims the reference to an acyl group is not to the acyl group derived from the carboxyl radical, but to the acyl group derived from the sulfonic acid radical. Furthermore, it is understood that it is immaterial what form the carboxyl radical takes, i. e., whether it is present in the form of the free acid, in the form of a salt, or in the form of the ester. All this has been indicated previously.

Having thus described our invention, what we claim as new and desire to secure by Letters Patent is:

1. A process for breaking petroleum emulsions of the water-in-oil type, characterized by subjecting the emulsion to the action of a demulsifier comprising a sulfato sulfonate derived from a polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

2. A process for breaking petroleum emulsions of the water-in-oil type, characterized by subjecting the emulsion to the action of a demulsifier comprising a water-soluble sulfato sulfonate derived from a polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

3. A process for breaking petroleum emulsions of the water-in-oil type, characterized by subjecting the emulsion to the action of a demulsifier comprising a water-soluble sulfato sulfonate derived from an aliphatic polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

4. A process for breaking petroleum emulsions of the water-in-oil type, characterized by subjecting the emulsion to the action of a demulsifier comprising a neutral water-soluble sulfato sulfonate derived from an aliphatic polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble.

5. A process for breaking petroleum emulsions of the water-in-oil type, characterized by subjecting the emulsion to the action of a demulsifier comprising a water-soluble sulfato sulfonate derived from an aliphatic polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms.

6. A process for breaking petroleum emulsions of the water-in-oil type, characterized by subjecting the emulsion to the action of a demulsifier comprising a water-soluble sulfato sulfonate derived from an aliphatic polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms; and said fatty sulfonic acid being derived from an unsaturated fatty acid.

7. A process for breaking petroleum emulsions of the water-in-oil type, characterized by subjecting the emulsion to the action of a demulsifier comprising a water-soluble sulfato sulfonate derived from an aliphatic polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementioned acyl radical is water-insoluble; said aliphatic polyhydric alcohol being characterized by the fact that the hydrocarbon radical present contains at least two carbon atoms and not more than six carbon atoms; and said fatty sulfonic acid being derived from a saturated fatty acid.

8. A process for breaking petroleum emulsions of the water-in-oil type, characterized by subjecting the emulsion to the action of a demulsifier comprising a water-soluble sulfato sulfonate derived from an aliphatic polyhydric alcohol in which one hydroxy hydrogen atom has been replaced by the acyl radical of a higher fatty acid sulfonic acid; and another hydroxy hydrogen atom of said polyhydric alcohol has been replaced by the linkage:

which in turn is united with a cation; said compound being further characterized by the fact that the selected sulfonic acid and selected polyhydric alcohol must be such that the hydroxylated ester derived by replacing one hydroxy hydrogen atom of the aforementioned polyhydric alcohol by the aforementionel acyl radical is water-insoluble; said aliphatic polyhydric alcohol being characterized by the fact that the hydrocarbon radical present contains at least two carbon atoms and not more than six carbon atoms; and said fatty sulfonic acid being derived from an hydroxylated fatty acid.

MELVIN DE GROOTE.
BERNHARD KEISER.